Sept. 23, 1930.   L. V. ROBINSON ET AL   1,776,325
METHOD OF MAKING CELLULAR WALL BOARD
Filed Oct. 6, 1927
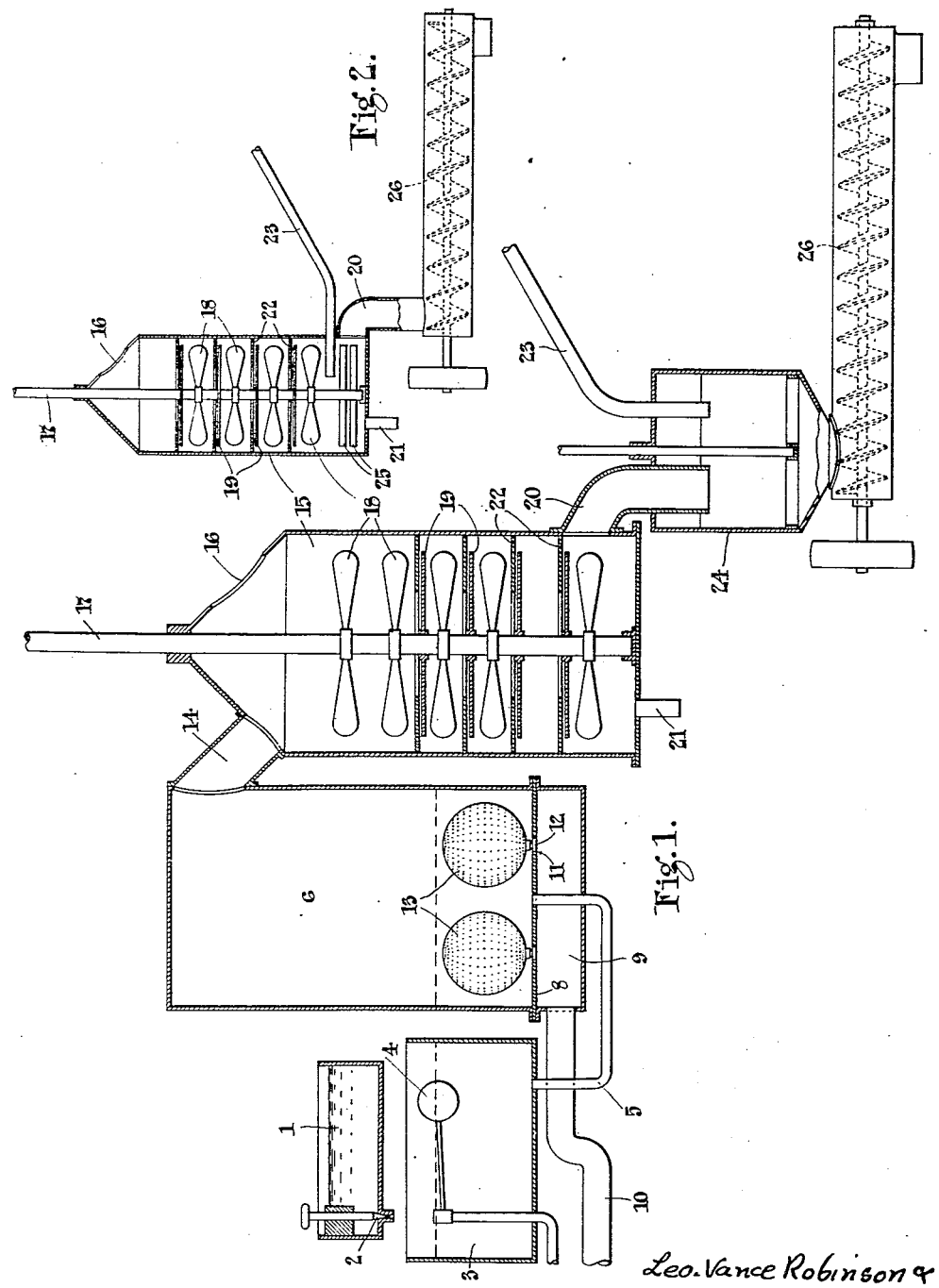
Leo. Vance Robinson &
GEORGE MILLER THOMSON
INVENTORS.
By Marks & Clark
ATTORNEYS Patented Sept. 23, 1930

1,776,325

UNITED STATES PATENT OFFICE

LEO VANCE ROBINSON AND GEORGE MILLER THOMSON, OF CALEDONIA, ONTARIO, CANADA, ASSIGNORS TO GYPSUM, LIME AND ALABASTINE, CANADA, LIMITED, OF PARIS, ONTARIO, CANADA

METHOD OF MAKING CELLULAR WALL BOARD

Application filed October 6, 1927. Serial No. 224,464.

This invention relates to improvements in the method of making cellular wall board from quick-setting cementitious material and to the product of such method.

Such wall board comprises a core of cementitious material, in which cells are formed, and paper sheet liners. Starch or other carbohydrate material has been used to increase the adhesiveness of the core and liners, the starch being cooked and thoroughly mixed with the cementitious material from which the core is made.

It is an object of this invention to provide an improved process for incorporating air and starch in the material forming the core of the board. To this end the starch is cooked and aerated or mixed with foam and the aerated starch is mixed with a slurry of the quick-setting material. The invention further comprises a cementitious material with which an aerated starch is incorporated.

The invention will be further described with reference to the accompanying drawing which diagrammatically illustrates a form of apparatus which may be used to operate the process, and in which Figure 1 is a view in sectional elevation, and Figure 2 represents a modified form of the agitating chamber.

In the drawing 1 represents a container for a concentrated solution of a foam forming agent, such as saponin, and has a needle valve 2 for regulating the flow of the solution. The tank 3 is connected to any available suitable water supply and has a float control valve 4 for regulating the admission of water. The solution from the container 1 enters the tank 3 and is mixed with the water admitted thereto. A bubble forming vessel 6 has a horizontal partition 8 which forms an air chamber in its lower end and which is adapted to hold water upon its upper surface, the water being supplied by the pipe 5. Air under constant pressure from any suitable source is admitted to the air chamber from which it is permitted to enter the water above the partition 8 in fine streams, to form bubbles which rise in the vessel 6.

The device illustrated has collapsible rubber bags 13 secured in openings in the partition 8 and the air enters these bags and passes through punctures therein in fine streams into the water, whereupon coarse bubbles form and rise to the surface of the water. This invention however is not limited to any particular method or means of making foam.

The bubbles thus formed pass into an agitating chamber 15 through the discharge chute 14 and are there subdivided or sliced to form a foam of any desired density by means of the impeller agitator blades 18 mounted on the rotatable shaft 17. The annular rings 22 secured to the wall of the chamber and plates 19 mounted on the shaft 17 direct the downward flow of the bubbles and insure the desired subdivision or slicing of the bubbles.

Water which may drain off the bubbles in the formation of the foam in the chamber 15 escapes through the drain pipe 21 and air liberated from the bubbles escapes through the vent 16 at the top of the chamber.

A suitable carbohydrate, such as starch, is mixed with water and agitated to separate the granules, when it is heated to approximately 190° F. to burst or break the so-called "pearls" and bring out the adhesive properties of the starch. A starch paste, thus formed in a known manner, is then aerated or mixed with foam.

Referring again to the drawing, Figure 1, the starch paste from a suitable source of supply is caused to flow through the pipe 23 and is discharged into a mixer 24, together with foam from the discharge pipe 22, both pipes discharging below the level of the starch and foam in the mixer as indicated. In the mixer 24 the starch paste and foam are intimately mixed by means of a suitable agitating device, such as a vertically disposed rotatable shaft provided with blades (not shown). As shown in Figure 2 the starch may be led directly into the bottom of the agitating chamber 15 where it is intimately mixed with the foam by means of agitator blades 25.

The aerated starch is then discharged from the mixer 24 or chamber 15 and conveyed directly to a mixer (not shown) by means of a double flight screw conveyor 26. In the last mentioned mixer the aerated starch is intimately incorporated in a slurry of plaster of Paris or other quick-setting cementitious material and the mixture is used to form the core of board, the core being covered with paper liners, in a manner well known to those skilled in the art. Fibrous material may be incorporated in the mixture if desired.

To illustrate the relative proportions of materials used it may be stated that very satisfactory results were obtained by using the following proportions, the units in which they are expressed being those used in practice and while they are not of the same denomination, it is thought that they adequately illustrate the point.

A dense foam, too stiff to flow, was fed into the mixer 24 at the rate of 0.72 cu. ft. per minute, simultaneously with the prepared starch liquid at the rate of 22 lbs. per minute. The starch liquid contained 1 lb. of starch to 14 lbs. of water. The mixture of foam and starch so made was intimately mixed with the slurry of plaster of Paris flowing at the rate of 135 lbs. per minute and the mixture fed onto the conveyor belt, carrying the paper liner, travelling at the rate of 49 feet per minute. The finished board, of standard thickness, so made weighed 1460 lbs. per thousand feet.

This method of aerating the starch and incorporating the starch in aerated form in the slurry separates the starch particles, better distributes the starch, and makes a smaller quantity of starch serve the purpose, at the same time giving to the slurry the desired porosity to form the cellular core which is caused to adhere to the liners by the starch.

When adding one ingredient in small amounts to the slurry it is difficult to get an entirely uniform mixture. Thus it is readily possible to get uniform mixture of the starch, aerated in the manner indicated, and the slurry since the volume ratio is substantially increased.

Moreover, when the foam is incorporated in the starch paste in the manner described, it does not readily break down in storage or during the mixing operation. It is thus possible to maintain the foam in a stable condition within the starch paste for substantial periods of time.

While the method of aerating the starch, above described, is preferable, the starch may be aerated by forming air bubbles directly in the starch liquid. Additional water containing the bubble forming agent may be added to the starch liquid and streams of air passed into the mixture while agitation is effected to subdivide the bubbles as before, and form the desired intimate mixture of starch and fine air bubbles. The product so prepared may be regarded as an emulsion of starch and air, and the emulsion is uniformly incorporated in the slurry as previously described.

We claim:

1. The process of making cellular insulating material comprising aerating a starch paste, mixing finely divided calcined gypsum with water to hydrate the same, uniformly mixing the aerated starch with the gypsum slurry, bringing the mass into the desired shape and drying the same.

2. The process of making insulating material which comprises incorporating a foam in a starch paste, adding water to finely divided calcined gypsum, intimately mixing the foam-containing starch with the gypsum slurry, giving the mass the desired form and drying the same.

3. In a process of making insulating material the step which comprises incorporating an aerated starch in a gypsum slurry.

4. The process of making wall board which comprises mixing a dense foam with a starch paste to expand the latter and form cells therein, adding the mixture to a slurry of calcined gypsum, placing the mass between sheet liners and drying the same.

5. The process of making wall board which comprises forming a dense foam, uniformly mixing the same with a starch paste to expand the latter and form cells therein, adding water to finely divided calcined gypsum in quantity sufficient to hydrate the same and before the latter begins to set intimately incorporating the starch-foam mixture therein, placing the mass between paper liners and drying the same.

6. The process of making insulating material comprising emulsifying a starch paste with air, mixing the starch emulsion with a slurry of gypsum, giving the mass the desired form and drying the same.

In testimony whereof we have affixed our signatures.

LEO V. ROBINSON.
GEORGE M. THOMSON.